United States Patent [19]

Fujii et al.

[11] Patent Number: 4,866,592

[45] Date of Patent: Sep. 12, 1989

[54] CONTROL SYSTEM FOR AN INVERTER APPARATUS

[75] Inventors: Masaaki Fujii; Toshihiro Nomura, both of Kawasaki, Japan

[73] Assignee: Fuji Electric Co., Ltd., Kawasaki, Japan

[21] Appl. No.: 175,495

[22] Filed: Mar. 30, 1988

[51] Int. Cl.$^4$ ............................................. H02M 5/42
[52] U.S. Cl. ..................................... 363/98; 363/37; 363/132
[58] Field of Search ..................... 363/37, 56, 98, 126, 363/132

[56] References Cited

U.S. PATENT DOCUMENTS 4,270,164  5/1981  Wyman et al. .................... 363/56
4,471,196  9/1984  Frank et al. ...................... 363/98 X

*Primary Examiner*—Patrick R. Salce
*Assistant Examiner*—Kristine Peckman
*Attorney, Agent, or Firm*—Spencer & Frank

[57] ABSTRACT

A control system for a transistor inverter comprising a circuit for detecting the load current or the output voltage from the inverter to produce a detection output; a circuit for outputting a control instruction for adjusting the load current; a leading angle forming circuit for combining the detection output with the control instruction to form a control signal corresponding to a leading angle at which the inverter output voltage is controlled with a leading phase relative to the load current; and a circuit receiving the control signal from the leading angle forming circuit and for forming a switching control signal, which is supplied to the switching devices in the inverter. The load current is not controlled directly by controlling the frequency of the inverter, but by changing the phase difference $\gamma$ between the load current and the inverter output voltage.

2 Claims, 6 Drawing Sheets

CONTROL SYSTEM FOR AN INVERTER APPARATUS

BACKGROUND OF THE INVENTION

1. Field of the Invention

The present invention relates to a control system for a transistor inverter, and more particularly to a control system for an inverter apparatus which is suitable for a power source for supplying an oscillating current (high frequency current) to an induction or heating coil or the like in an electromagnetic induction heating apparatus.

2. Description of the Prior Art

As to a power source apparatus of this kind, there has been conventionally used a transistor inverter as shown in FIG. 1. In FIG. 1, reference numeral 1 denotes a thyristor rectifier for varying a d.c. voltage; 2, a choke coil; 3, an electrolytic capacitor used as a voltage source; 4a, 4b, 4c, 4d, transistors for performing high frequency switching; 5a, 5b, 5c, 5d, back-flow diodes; 6, a resonance capacitor for improving the power factor; and 7, a heating coil in the form of an induction coil.

In FIG. 1, the transistors 4a through 4d constituting an inverter 40 perform switching only in accordance with the LC resonance frequency defined by the resonance circuit composed of the resonance capacitor 6 and the heating coil 7. Accordingly, the load current I is controlled by changing a d.c. intermediate circuit voltage $V_{DC}$ in accordance with the phase control of the thyristor rectifier 1. Accordingly, the transistor inverter requires an arrangement for controlling the switching timing of the transistors 4a through 4d and an arrangement for controlling the phase of the thyristor rectifier 1, and therefore inevitably has a complicated arrangement. Moreover, the thyristor rectifier 1 has a disadvantage in that the power factor on the power supply side is deteriorated when the firing angle of the thyristor rectifier 1 is increased.

FIG. 2 shows a power source in which a diode rectifier 8 is used instead of the thyristor rectifier 1 shown in FIG. 1. Here, the load current I is controlled by controlling only the switching timing of the transistors 4a, 4b, 4c and 4d, while maintaining the d.c. intermediate voltage $V_{DC}$ constant. In FIG. 2, reference numeral 9 denotes a current transformer, which is coupled to the current path of the load current I, for detecting the load current I. Reference numeral 10 denotes a full wave rectifying circuit for rectifying the current detected by the current transformer 9 over the full wave thereof after the detected current is converted into a voltage signal. Reference numeral 11 denotes a current adjusting circuit for controlling the load current I by controlling the output voltage from the full wave rectifying circuit 10 in accordance with a load current instruction value IK. Reference numeral 12 denotes a V/F converter for converting the voltage output from the current regulator 11 into a corresponding frequency output so as to obtain a base drive signal for the transistors 4a, 4b, 4c and 4d.

In the above-mentioned control system, its load circuit is formed by an L-C-R series resonance circuit, and thus this control system has the following relationships:

$$I = V_o / \sqrt{R^2 + (2\pi f L - \tfrac{1}{2\pi f c})^2}.$$

This system utilizes such a fact that the load current I varies in accordance with the change in frequency f. That is, in such a circuit, the output frequency f of the inverter 40 is changed in accordance with the desired load current I.

FIG. 3 shows the relationship between the load current I and the output frequency f of the inverter 40.

FIG. 4 illustrates the relationship between the output voltage Vo from the inverter 40 and the load current I. It is noted that the output voltage Vo of the inverter 40 has a leading phase of $\gamma$ with respect to the load current I in this control system, as shown in FIG. 4. That is, the transistors 4a and 4d are interrupted before the load current drops to zero, and subsequently the transistors 4b and 4c (the transistors opposite the transistors 4a and 4d) are turned on, respectively. The reason follows. After the transistors through which the load current I flows are interrupted and if subsequently the transistors opposite the other transistors are turned on under a condition that the load current is flowing in the reverse direction after the load current is rendered to zero, the reverse recovery current of the back-flow diodes 5a, 5b, 5c, and 5d would increase, so that the heat generation of the back-flow diodes becomes large, particularly for a high frequency application, as with the above-mentioned apparatus. Therefore, there is the possibility that the transistors would be damaged. Furthermore, a switching loss would inevitably occur when the opposite transistors are turned on.

Because of the above-mentioned reasons, it is required that the output voltage Vo of the inverter 40 have a leading phase with respect to the load current I. As a consequence, the inverter is required to be controlled at a frequency higher than the resonant frequency of the L-C-R circuit in the case of the frequency control system as shown in FIG. 2.

However, in the case of using a coil L, as in the case of induction heating, an object to be heated has a magnetic permeability and a specific resistance which vary greatly, depending upon its temperature, and thus the resonance frequency and resonance current vary depending upon the temperature of the heated object.

FIG. 3 shows examples of the above-mentioned relationship between the resonance frequency and the resonance current, in which curve A relates to the object to be heated at a temperature around room temperature, while curve B relates to the object to be heated at a temperature exceeding the Curie temperature. From the above-mentioned reason, the frequency control as shown in FIG. 2 is not effective in the case of a frequency below $f_B$ shown in FIG. 3, and therefore, there is a disadvantage in that power cannot be effectively supplied to the object to be heated at a temperature around room temperature, as shown by curve A.

SUMMARY OF THE INVENTION

The present invention is devised in view of the above-mentioned problems, and therefore, it is an object of the present invention to provide a control system for a high frequency inverter which can feed a current to a load coil effectively irrespective of the temperature condition of an object to be heated.

It is another object of the present invention to provide a control system for a high frequency inverter which has a simple control circuit arrangement.

Accordingly, in order to attain the above-mentioned objects of the present invention, in the present invention, a sawtooth wave output synchronized with the phase of the load current is compared with an output corresponding to a control instruction for designating the value of the load current to determine ON and OFF timings of turning on and interrupting switching devices of the inverter in such a way that the output voltage is controlled with a leading phase relative to the load current, and the load current and its frequency are regulated by changing the phase angle of the leading phase.

To that end, an inverter apparatus is provided for supplying high frequency power to an induction coil, comprising a means for detecting a load current or an inverter output voltage; a means for transmitting a control instruction to regulate the above-mentioned load current, a means for producing a control leading angle to control the output voltage with a leading phase with respect to the load current by composing the load current or the output voltage and the control instruction angle; and a means for introducing an output from the control leading angle producing means to transmit a switching control signal to switching elements in the inverter and for regulating the load current entering the said leading coil and the frequency in accordance with the value of the leading angle.

The present invention provides a control system for an inverter apparatus having switching devices and for supplying high frequency power to an induction coil, comprising:

means for detecting a load current or an inverter output voltage from the inverter apparatus to produce a detection output;

means for outputting a control instruction for adjusting the load current;

a leading angle forming means for combining the detection output with the control instruction to form a control signal corresponding to a leading angle at which the inverter output voltage is controlled with a leading phase relative to the load current; and means for receiving the control signal from the leading angle producing and for forming a switching control signal, the switching control signal being supplied to the switching devices in the inverter apparatus to adjust the load current into the induction coil in accordance with the value of the leading angle.

Here, the leading angle forming means may include means for generating a sawtooth wave synchronized with the phase of the load current in response to the detection output and means for comparing the sawtooth wave with the control instruction to form the control signal.

The control system may further comprise a delay means for delaying the switching control signal by a delay time corresponding to a turn-off time of the switching devices to output a turn-on instruction for the switching devices.

Further, the means for generating a sawtooth wave may include a zero-cross point detection means for detecting a zero-cross point of the load current, an F/V converting means for converting a frequency of an output from the zero-cross point detection means into a voltage level, means for integrating the voltage level from the F/V converting means to generate the sawtooth wave, means for forming a reset pulse for the integrating means in response to a zero-cross point detection output from the zero-cross point detection means, the reset pulse being supplied to the integrating means, thereby generating the sawtooth wave from the integrating means.

The above and other objects, effects, features and advantages of the present invention will become more apparent from the following description of preferred embodiments thereof taken in conjunction with the accompanying drawings.

DETAILED DESCRIPTION OF PREFERRED EMBODIMENTS

Figure 1:
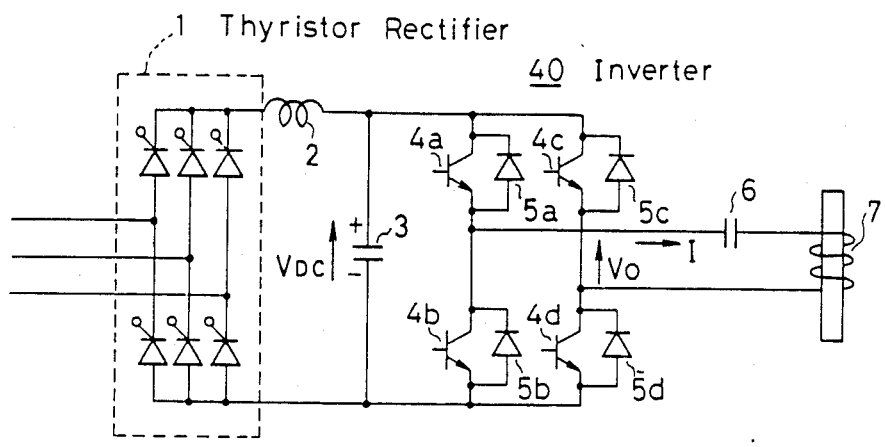
FIGS. 1 and 2 are circuit diagrams showing two examples of a conventional in apparatus.
Figure 3:
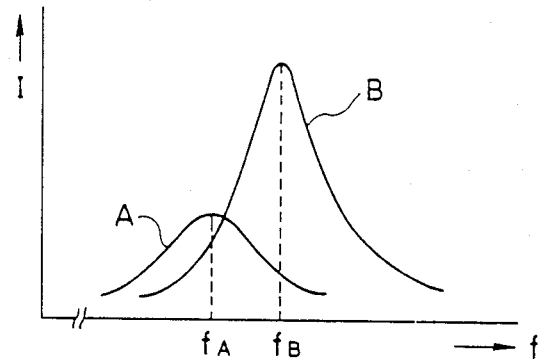
FIG. 3 illustrates the relationship between the load current and its frequency.
Figure 2:
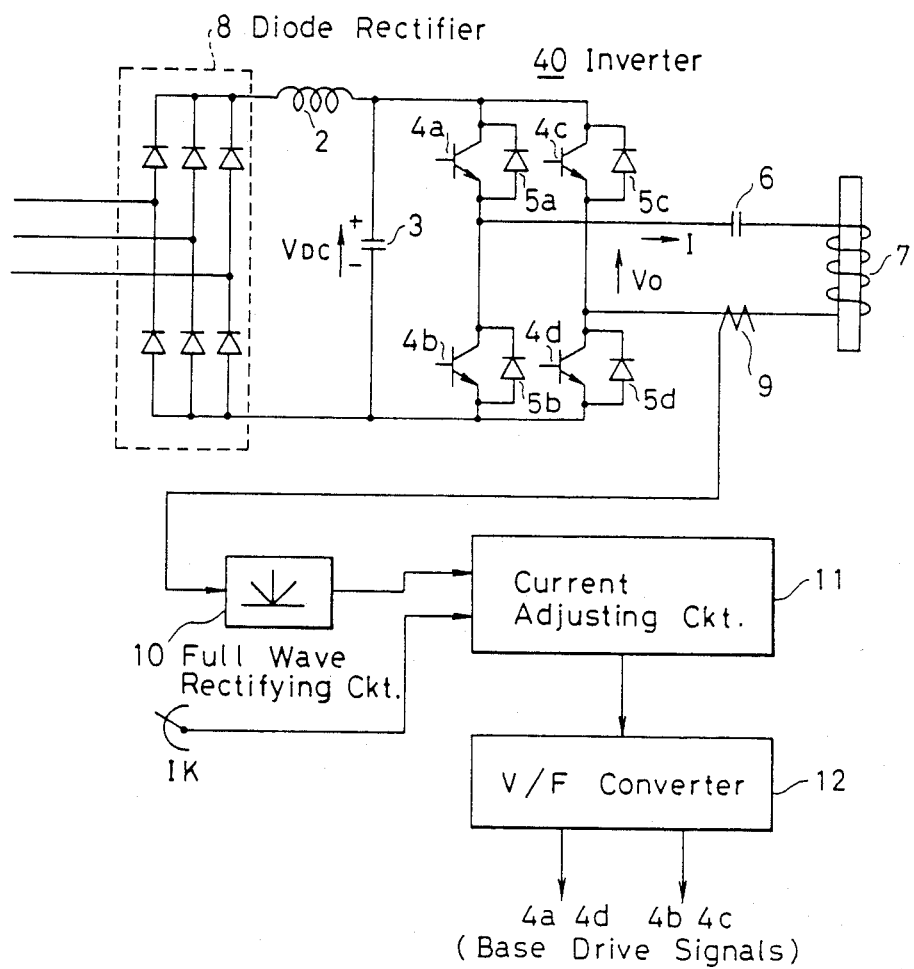
Figure 4:
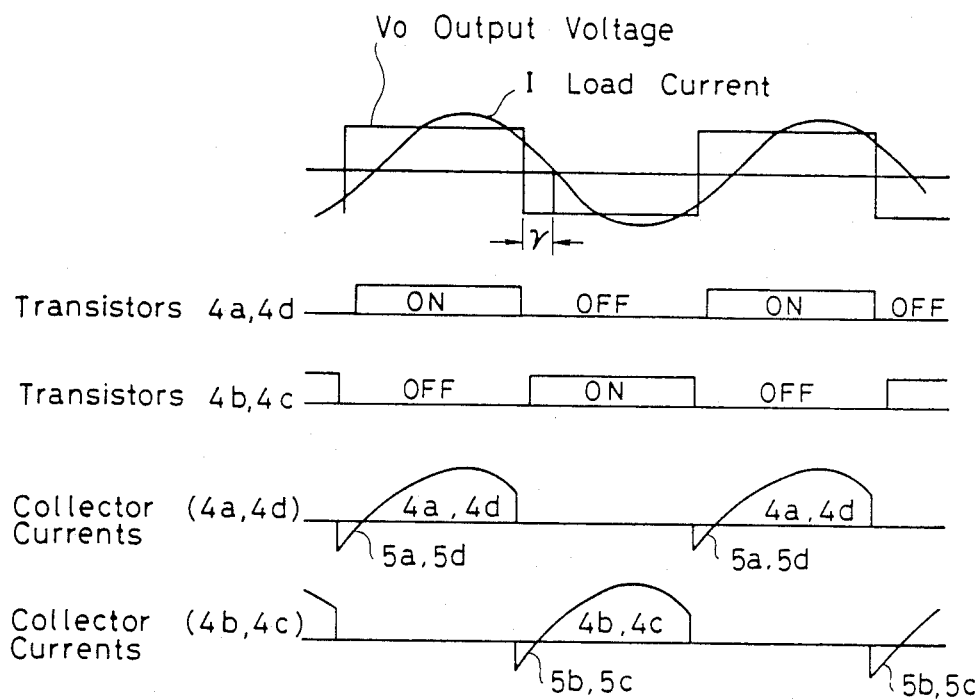
FIG. 4 illustrates various waveforms in various portions of FIG. 2 to explain the conventional inverter apparatus shown in FIG. 2.
Figure 5:
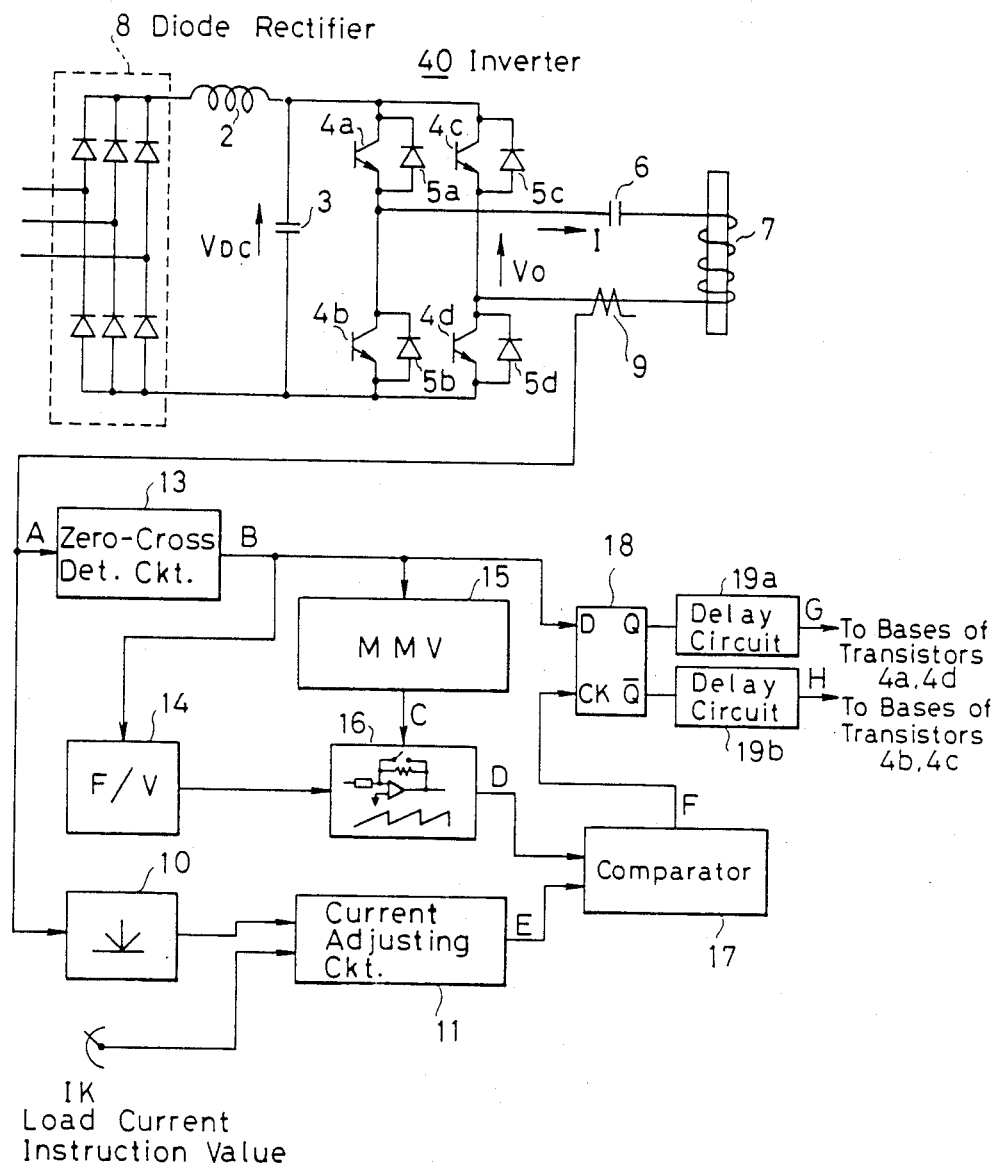
FIG. 5 is a circuit diagram showing one embodiment of the present invention.

FIG. 5 shows one embodiment of the present invention, in which an inverter main circuit is identical to that shown in FIG. 2, and therefore, the same reference numerals are used to indicate the corresponding parts. Reference numeral 13 denotes a zero-cross detecting circuit which is connected to the output terminal of the current transformer 9 and judges the polarity of the load current I. Reference numeral 14 denotes an F/V converter which is connected to the output terminal of the zero-cross detecting circuit 13 and converts the frequency of the detection output signal from the zero-cross detecting circuit 13 into a corresponding voltage.

The current transformer 9 detects the load current I and converts the detected current into a voltage, which is applied to the zero-cross detecting circuit 13. The zero-cross detecting circuit 13 judges the polarity of the load current I as shown by the waveform of output B in FIG. 6. This signal B is transmitted to a D flip-flop 18 as a judging signal for determining which pair of transistors 4a–4d is to be interrupted. The signal B is also transmitted to a monostable multivibrator 15 to form a reset pulse C from the signal B. The reset pulse is applied to an integrator included in a sawtooth wave generating circuit 16. The signal B is also applied to the F/V converter 14. The integrator included in the sawtooth wave generating circuit 16 is reset by the reset pulse C from the monostable multivibrator 15. The reset pulse C is generated at the zero-cross point of the load current I, and thereafter the integrator integrates the output from the F/V converter 14. With this arrangement, it is possible to generate a sawtooth wave synchronized with the load current I and having a constant level, even if the frequency of the load current I varies, as shown by the output D in FIG. 6.

Figure 6:
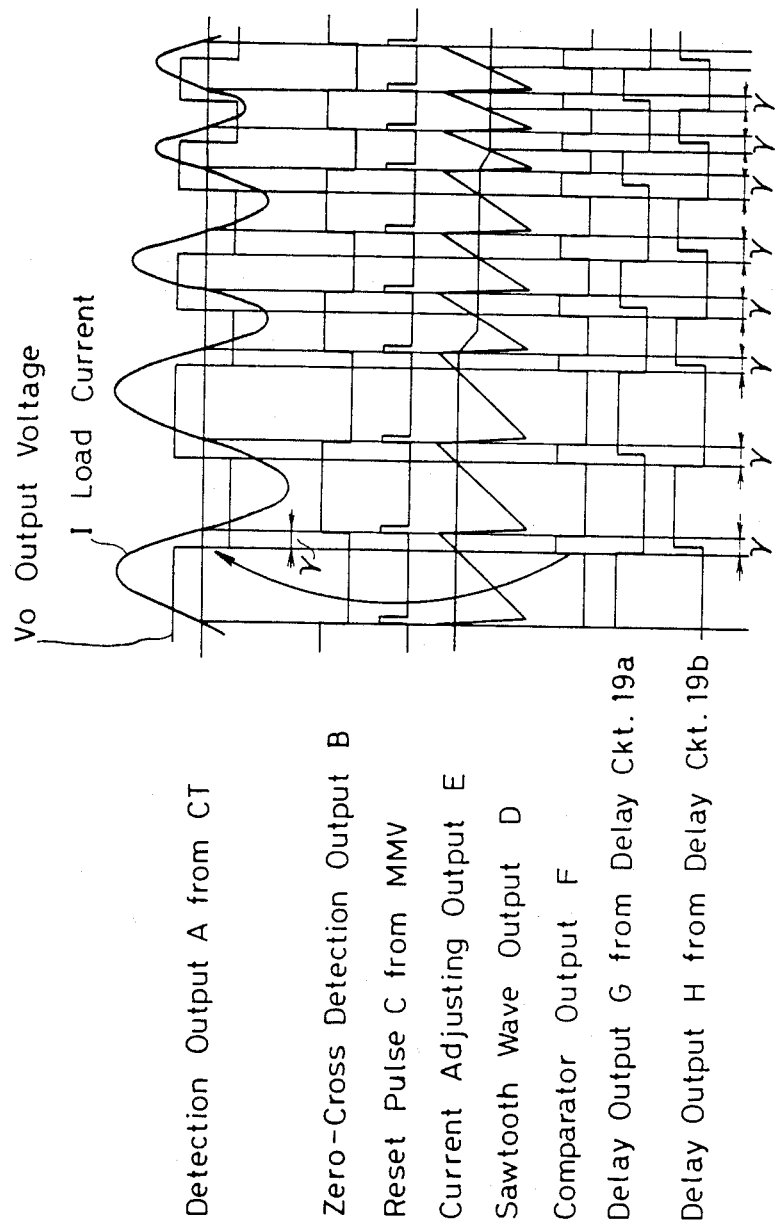
FIG. 6 illustrates waveforms in various portions of FIG. 5 to explain the operation of the apparatus shown in FIG. 5.
Figure 7:
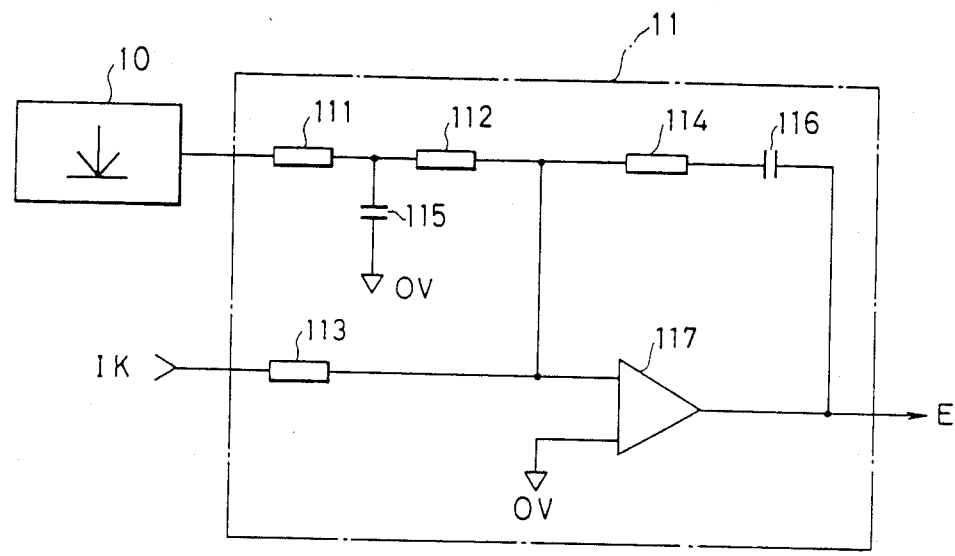
FIG. 7 is a circuit diagram showing an example of the current adjusting circuit shown in FIG. 5.

A load current instruction value IK, which is adjusted manually or automatically to control, under instructions, the value of the load current I, and a detection value obtained from the full wave rectifying circuit 10, to which the load current detection signal A from the current transformer 9 is applied are applied to the current adjusting circuit 11. The current adjusting circuit 11 can be in the form of P-I adjusting circuit which is operated to make the difference between the load current instruction value IK and the detection value always zero. An example of the current adjusting circuit 11 is shown in FIG. 7. In FIG. 7, reference numerals 111, 112, 113 and 114 denote resistors. Reference numerals 115 and 116 denote capacitors. Reference numeral 117 denotes an operational amplifier. The resistors 111 and 112 and the capacitor 115 form a low pass filter. The resistor 114 and the capacitor 116 form a feed back loop for P-I control and, together with the operational amplifier 117, perform P and I adjustments, respectively. In other words, the operational amplifier 117 produces a P-I adjusted output signal E in accordance with the load current instruction value IK manually or automatically set. The output signal E from the current adjusting circuit 11 is compared with the above-mentioned sawtooth wave D by a comparator 17 to obtain a comparison output F. The comparison output F determines the timing at which the transistors are interrupted in such a way that the output voltage Vo has a leading phase (an angle $\gamma$ as shown in FIG. 6) relative to the load current I.

The output F of the comparator 17 is applied to a clock terminal CK of the D flip-flop 18, which then outputs at its output terminal Q an interruption instruction to the transistors (for example, 4a, 4d) supplying the load current I and also outputs at its output terminal $\overline{Q}$ a turn-on instruction to the transistors (for example, 4b, 4c) opposite to the former transistors.

Delay circuits 19a and 19b delay the turn-on instruction by delay times corresponding to the turn-off times of the transistors 4a–4d to prevent the transistors 4a and 4b (or 4c and 4d) from being short-circuited simultaneously. When it is required to control the load current I, it is now assumed that the output E of the current regulator 11 varies, for example, decreases, as shown in FIG. 6. Then, the phase difference $\gamma$ between the load current I and the output voltage Vo is increased, and therefore, the load current can be decreased.

The reason follows. A load impedance Z, as viewed from the output side of the inverter, which is the impedance Z of the R-L-C series circuit, can be represented as follows:

$$Z = R/\cos \gamma,$$

where $\cos \gamma = R/\sqrt{R^2 + (2\pi fL - 1/(2\pi fc))^2}$

Accordingly, the load current I can be represented as follows:

$$I = Vo/Z = Vo \cos \gamma /R$$

Therefore, the load current I can be changed by changing the phase difference $\gamma$.

Further, the voltage across the capacitor 6 can be detected by a voltage transformer (which is not shown), instead of the current transformer 9. In this case, the thus detected voltage is applied to the zero-cross detecting circuit 13 and the full wave rectifying circuit 10. A voltage regulator is used instead of the current regulator 11, so that the interruption timing of the transistors can be determined in a manner similar to that mentioned above. As a result, the output voltage Vb can always be controlled with a leading phase relative to the load current I. It is possible to regulate the load current I by changing the leading phase angle.

In the arrangement of the present invention, there are provided a circuit for detecting the load current or the output voltage from the inverter to produce a detection output; a circuit for outputting a control instruction for adjusting the load current; a leading angle forming circuit for combining the detection output with the control instruction to form a control signal corresponding to a leading angle at which the inverter output voltage is controlled with a leading phase relative to the load current; and a circuit receiving the control signal from the leading angle forming circuit and for forming a switching control signal, which is supplied to the switching devices in the inverter. In this manner, the load current is not controlled directly by controlling the frequency of the inverter, but by changing the phase difference $\gamma$ between the load current and the inverter output voltage. Therefore, the load current can be fed efficiently and safely over a wide range, even if a load condition such as a condition of the heating coil is varied. The arrangement of the inverter main circuit and the arrangement of the control circuit can be simplified.

The invention has been described in detail with respect to preferred embodiments, and it will now be apparent from the foregoing to those skilled in the art that changes and modifications may be made without departing from the invention in its broader aspects, and it is the invention, therefore, in the appended claims to cover all such changes and modifications as fall within the true spirit of the invention.

What is claimed is:

1. A control system for controlling an inverter supplying high frequency power to an inductive load in a series with a capacitor, said inductive load and capacitor forming a series resonant circuit having an alternating load current flowing therethrough, said invertor comprising semiconductor switching devices connected in the form of a bridge, each of said switching devices conducting current in a given direction and having a diode connected thereacross for conducting current in the direction opposite said given direction, a d.c. input voltage being applied to said inverter from a d.c. voltage source and an alternating output voltage leading said alternating load current by a predetermined phase angle being generated by said inverter and applied across said series resonant circuit, wherein the improvement comprises:

a zero-cross detector for detecting changes in the polarity of said alternating load current, said zero-cross detector generating a pulse each time said load current changes polarity;

a frequency detector for detecting the frequency of said alternating load current, said frequency detector generating a voltage proportional to said frequency;

a sawtooth wave generating circuit, having an integrator, coupled to the outputs of said frequency and zero-cross detectors, said sawtooth wave generating circuit integrating the voltage at the output of said frequency detector and being reset by the pulse at the output of said zero-cross detector to generate a sawtooth wave voltage synchronized with said alternating load current and having a constant amplitude;

a load current detector for detecting the magnitude of said alternating load current, said load current detector generating a d.c. voltage corresponding to the magnitude of said load current;

a current regulator coupled to said load current detector and adapted to receive an input signal corresponding to a desired value of said alternating load current, said current regulator comparing said input signal with the d.c. voltage generated by said load current detector and generating a current control voltage corresponding to said predetermined phase angle;

a comparator coupled to said sawtooth wave generating circuit and said current regulator for comparing said sawtooth wave and current control voltages, said comparator generating a pulse signal having a duration corresponding to said predetermined phase angle in accordance with said current control voltage; and a switching control signal generating means coupled to said comparator and said semiconductor switching devices, said switching control signal generating means switching respective ones of said semiconductor switching devices in accordance with the pulse signal from said comparator, whereby said load current is controlled by changing said predetermined phase angle between said alternating load current and the alternating output voltage generated by said inverter.

2. The control system for controlling an inverter as claimed in claim 1 which further comprises delay means for delaying the control signal generated by said switching control signal generating means by a delay time corresponding to the turn-off time of said semiconductor switching devices.

* * * * *